(12) United States Patent
Depondt (10) Patent No.: US 11,305,736 B2
(45) Date of Patent: Apr. 19, 2022

(54) WIPER DEVICE (71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 16/065,420

(22) PCT Filed: Dec. 16, 2016

(86) PCT No.: PCT/EP2016/081461
§ 371 (c)(1),
(2) Date: Jun. 22, 2018

(87) PCT Pub. No.: WO2017/108616
PCT Pub. Date: Jun. 29, 2017

(65) Prior Publication Data
US 2018/0370495 A1    Dec. 27, 2018

(30) Foreign Application Priority Data

Dec. 22, 2015  (DE) .......................... 102015226527.7

(51) Int. Cl.
*B60S 1/38* (2006.01)
*B60S 1/40* (2006.01)
*B60S 1/52* (2006.01)

(52) U.S. Cl.
CPC .......... *B60S 1/3862* (2013.01); *B60S 1/4048* (2013.01); *B60S 1/524* (2013.01); *B60S 2001/4054* (2013.01)

(58) Field of Classification Search
CPC ........ B60S 1/3862; B60S 1/522; B60S 1/524; B60S 1/3805; B60S 1/4038; B60S 1/4048;
(Continued)

(56) References Cited

U.S. PATENT DOCUMENTS 2,432,690 A * 12/1947 Smulski .................... B60S 1/40
15/250.04
2014/0026348 A1* 1/2014 Schaeuble ............ B60S 1/4003
15/250.32
(Continued)

FOREIGN PATENT DOCUMENTS

CN      201327939 Y   10/2009
CN      102164786 A   8/2011
(Continued)

OTHER PUBLICATIONS

Machine language translation of description portion of German publication 102004007351, published Sep. 2005. (Year: 2005).*

(Continued)

*Primary Examiner* — Gary K. Graham
(74) *Attorney, Agent, or Firm* — Michael Best & Friedrich LLP (57) ABSTRACT

The invention relates to a wiper device (10) comprising a wiper blade adapter (12) having at least one first wiper blade adapter element (14) and at least one second wiper blade adapter element (16), which is connected to the first wiper blade adapter element (14) in at least one assembled state, and is provided for connecting to at least one wiper arm adapter (18), and comprising a spraying unit (20). According to the invention, in the assembled state, the spraying unit (20) is arranged at least partially between the first wiper blade adapter element (14) and the second wiper blade adapter element (16).

21 Claims, 8 Drawing Sheets

(58) Field of Classification Search
CPC .... B60S 1/4045; B60S 1/3851; B60S 1/3849; B60S 2001/4054; B60S 1/40; B60S 1/3415; B60S 1/52
USPC ................................... 15/250.04; 239/284.1
See application file for complete search history.

(56) References Cited

U.S. PATENT DOCUMENTS

2014/0026349 A1* 1/2014 Schaeuble ................. B60S 1/40
                                                15/250.32
2015/0183405 A1   7/2015 Trebouet

FOREIGN PATENT DOCUMENTS

| DE | 102004007351 | * | 9/2005 |
| DE | 102010025687 A1 | | 1/2012 |
| EP | 2692596 A2 | | 2/2014 |
| EP | 2815932 A1 | | 12/2014 |
| EP | 3002168 A1 | | 4/2016 |
| EP | 3012163 A1 | | 4/2016 |
| EP | 3138743 A1 | | 3/2017 |
| FR | 3003220 A1 | | 9/2014 |
| WO | 2014020283 A1 | | 2/2014 |

OTHER PUBLICATIONS

International Search Report with English translation and Written Opinion for Application No. PCT/EP2016/081461 dated Apr. 25, 2017 (10 pages).

* cited by examiner

WIPER DEVICE

BACKGROUND OF THE INVENTION

A wiper device which comprises a wiper blade adapter has already been proposed. The wiper blade adapter comprises a first wiper blade adapter element and a second wiper blade adapter element which are connected together in an assembled state. In the assembled state, a spraying unit of the wiper device is arranged laterally on the second wiper blade adapter element.

SUMMARY OF THE INVENTION

The invention is based on a wiper device comprising a wiper blade adapter having at least one first wiper blade adapter element which is provided, in particular for a connection, in particular for a direct and/or indirect connection, to at least one wiper blade component, in particular at least one spring rail, and at least one second wiper blade adapter element which is connected to the first wiper blade adapter element, in at least one assembled state, in particular pivotably mounted relative to the first wiper blade adapter element, and is provided for connecting to at least one wiper arm adapter and which, in particular in the assembled state, at least partially encompasses the wiper blade adapter element, and comprising a spraying unit which is provided, in particular, to spray washer fluid onto a window to be wiped.

It has been proposed that in the assembled state the spraying unit is arranged at least partially between the first wiper blade adapter element and the second wiper blade adapter element. A "wiper device" is intended to be understood, in particular, as at least one part, in particular a subassembly of a wiper, wherein, in particular, additionally accessories for the wiper may also be encompassed. In particular, the wiper device may also encompass the entire wiper. A "wiper blade adapter" in this context is intended to be understood, in particular, as an adapter which has a contact region with a wiper blade component and is captively connected to the wiper blade component and is provided to supply a coupling region of the wiper blade component for coupling and/or contact with a wiper arm adapter. The wiper blade component could, for example, be a spring rail and/or a spoiler unit and/or an end cap unit and/or a wiper strip unit. A "wiper blade adapter element" is intended to be understood, in particular, as a component of a wiper blade adapter which, in particular, is movable, in particular freely movable, relative to a further component of the wiper blade adapter, in particular in at least one dismantled state. The first wiper blade adapter element is provided, in particular, for a coupling to the wiper blade component and, in particular, has at least one coupling region for a coupling to the wiper blade component. In particular, the first wiper blade adapter element is provided in the assembled state to be coupled captively to the wiper blade component. For example, the first wiper blade adapter element could be provided for a coupling to the wiper blade component via a welded connection and/or via an ultrasonic welded connection and/or via a latching connection. The first wiper blade adapter element has, in particular, at least one bearing pin which is provided for a pivotable mounting of the second wiper blade adapter element on the first wiper blade adapter element. The second wiper blade adapter element, in particular, is provided in the assembled state to be coupled captively to the first wiper blade adapter element. In the assembled state the second wiper blade adapter element, in particular, is pivotably coupled and/or arranged on the bearing pin of the first wiper blade adapter element and, in particular, pivotably mounted about a pivot axis extending through the bearing pin, relative to the first wiper blade adapter element. The first wiper blade adapter element in the assembled state is arranged at least partially inside the second wiper blade adapter element and/or at least partially encompassed and/or surrounded by the second wiper blade adapter element. Advantageously, the first wiper blade adapter element is configured integrally. Advantageously, the second wiper blade adapter element is configured integrally. "Integrally" is intended to be understood, in particular, as connected at least by a material connection, for example by a welding process, a bonding process, an injection-molding process and/or a different process appearing expedient to the person skilled in the art and/or advantageously formed in one piece, such as for example by production from a casting and/or by a production in a single-component or multi-component injection-molding method and advantageously from a single blank. In particular, the wiper device comprises the wiper arm adapter. A "wiper arm adapter" in this context is intended to be understood, in particular, as an adapter which has a contact region with a wiper arm component and is captively connected to the wiper arm component, and is provided to supply a coupling region of the wiper arm component for coupling and/or contact with a wiper blade adapter, in particular with a wiper blade adapter element of the wiper blade adapter. The second wiper blade adapter element in the assembled state, in particular, is coupled to the wiper arm adapter. In particular, the wiper arm adapter in the assembled state is coupled fixedly in terms of rotation to the second wiper blade adapter element and, in particular, pivotably mounted relative to the first wiper blade adapter element by the coupling of the wiper arm adapter to the second wiper blade adapter element fixedly in terms of rotation. A "spraying unit" is intended in this context to be understood, in particular, as a unit which has at least one nozzle element. A "nozzle element" is intended, in particular, to be understood as an element which is provided to spray a liquid such as, in particular, washer fluid for cleaning a window to be wiped, in particular a vehicle windshield to be wiped, in a specific spraying direction. In particular, the nozzle element has at least one nozzle opening which opens a washer fluid system to the surroundings. The nozzle element may be produced from a metal and/or particularly advantageously from a plastics material. Preferably, the nozzle element is provided to be coupled to a washer fluid channel unit, in particular to a channel element of the washer fluid channel unit, and/or to a washer fluid hose of the washer fluid channel unit. In the assembled state, the spraying unit is arranged, in particular, at least in a direction oriented substantially perpendicular to the window to be wiped between the first wiper blade adapter element and the second wiper blade adapter element. Starting from the window to be wiped, a linear connection which, in particular, connects together the first wiper blade adapter element and the second wiper blade adapter element, initially intersects the first wiper blade adapter element, then the spraying unit and subsequently the second wiper blade adapter element. In particular, at least any plane exists in which the spraying unit is surrounded by the wiper blade adapter elements over an angular range of at least 90°, in particular of at least 180°, advantageously of at least 270°, particularly advantageously of at least 300° and preferably of at least 330° relative to a central point and/or center of gravity of the spraying unit. "Provided" is intended to be understood, in particular, as specifically designed and/or equipped. By an object being provided for a specific function is intended to be understood, in particular, that the object fulfills and/or performs this specific function in at least one use state and/or operating state.

By the design according to the invention of the wiper device, in particular, advantageous operating properties may be achieved. In particular, the spraying unit may be arranged so as to be protected, whereby, in particular, damage to the spraying unit may be avoided. Further components for an arrangement and/or fastening of the spraying unit may be dispensed with, in particular. In particular, a compact design may be provided.

For example, in the assembled state the spraying unit could be directly connected to the first wiper blade adapter element and, in particular, fastened to the first wiper blade adapter element, in particular directly. Preferably, in the assembled state the spraying unit is connected to the second wiper blade adapter element, in particular directly, and advantageously directly fastened to the second wiper blade adapter element. In the assembled state, the spraying unit, in particular, is connected fixedly in terms of rotation to the second wiper blade adapter element and advantageously fastened fixedly in terms of rotation to the second wiper blade adapter element. As a result, the spraying unit, in particular, may be particularly suitably arranged between the first wiper blade adapter element and the second wiper blade adapter element.

In the assembled state, the spraying unit could, for example, be connected by means of a welded connection and/or by means of an ultrasonic welded connection and/or by means of a connection effected by hooking and/or by means of a connection effected by locking and/or by means of a snap connection to the second wiper blade adapter element and, in particular, fastened by means of this connection to the second wiper blade adapter element. Preferably, in the assembled state the spraying unit is connected to the second wiper blade adapter element by means of a latching connection and, in particular, fastened by means of the latching connection to the second wiper blade adapter element. For example, the first wiper blade adapter element could have at least one, in particular spring elastic, latching element which, in particular, could be provided to be deflected elastically during a fastening process in order to engage subsequently by an internal clamping force behind a corresponding latching element of the spraying unit. Alternatively or additionally, the spraying unit could have at least one, in particular spring elastic, latching element which, in particular, could be provided to be deflected elastically during a fastening process in order to engage subsequently by an internal clamping force behind a corresponding latching element of the second wiper blade adapter element. As a result, the connection between the spraying unit and the second wiper blade adapter element may, in particular, be produced and/or released particularly rapidly, whereby, in particular, a simple assembly and/or dismantling of the spraying unit may be possible.

It is further proposed that the first wiper blade adapter element defines at least one first receiving region which is provided in the assembled state to receive at least one part of the spraying unit. The first receiving region, in particular, is at least partially delimited and/or defined by the first wiper blade adapter element. In particular, the first wiper blade adapter element in the assembled state forms at least one lateral, and in particular at least one lower, boundary of the first receiving region. The spraying unit in the assembled state, in particular, is arranged at least partially in the first receiving space. As a result, in particular, a protected and/or secure arrangement of the spraying unit may be achieved.

Moreover, it is proposed that the second wiper blade adapter element defines at least one second receiving region which is provided in the assembled state to receive at least a substantial part of the spraying unit. The second receiving region, in particular, is delimited and/or defined at least partially and advantageously at least substantially by the second wiper blade adapter element. In particular, the second wiper blade adapter element in the assembled state forms at least one lateral, advantageously at least two lateral, particularly advantageously at least three lateral and preferably at least one upper boundary/boundaries of the second receiving space. The spraying unit in the assembled state, in particular, is arranged at least substantially in the second receiving space. In the assembled state the first wiper blade adapter element and the second wiper blade adapter element, in particular, form and/or define a total receiving space which, in particular, comprises the first receiving space and the second receiving space. As a result, in particular, the spraying unit may be particularly advantageously mounted.

The spraying unit could be arranged in the assembled state, in particular, at least substantially in a vertical direction above the first wiper blade adapter element. Preferably, in the assembled state the spraying unit protrudes in a wiper blade longitudinal direction at least partially over the first wiper blade adapter element. The spraying unit and, in particular the second wiper blade adapter element, protrude(s) in the assembled state in the wiper blade longitudinal direction, in particular on a region of the wiper blade adapter remote from the wiper arm adapter, at least partially over the first wiper blade adapter element. The wiper blade longitudinal direction, in particular, is oriented at least substantially perpendicular to a wiping direction. The wiper blade longitudinal direction is, in particular, oriented at least substantially parallel to a window to be wiped. As a result, in particular, spraying units of different sizes may be received in the wiper blade adapter and/or a high degree of flexibility may be achieved. In particular, an unhindered spraying of washer fluid onto the window to be wiped may be permitted and/or a recess in the first wiper blade adapter element may be dispensed with.

It is further proposed that the first wiper blade adapter element comprises at least one through-recess for at least one washer fluid channel unit. In particular, the first wiper blade adapter element delimits the through-recess. The through-recess, in particular, is an opening and/or a hole and/or a recess in a wall of the first wiper blade adapter element, in particular in a lateral boundary of the first receiving space. In the assembled state the through-recess, in particular, is arranged on a region of the first wiper blade adapter element facing the wiper arm adapter in the wiper blade longitudinal direction. The wiper device has, in particular, the washer fluid channel unit. In particular, the washer fluid channel unit in the assembled state engages and/or protrudes at least partially through the through-recess, in particular, for a connection to the spraying unit. A "washer fluid channel unit" is intended to be understood, in particular, as a unit which in at least one operating state forms at least one channel and is provided for passing fluid, in particular washer fluid, through the channel. A "channel" is intended to be understood, in particular, as a geometric element which in at least one operating state is provided for passing through fluid, in particular washer fluid. By the term that the washer fluid channel unit is provided in at least one operating state for "passing through fluid", is intended to be understood, in particular, that the washer fluid channel unit is provided in the operating state to transport the fluid, arriving at one end of the washer fluid channel unit, from one end of the washer fluid channel unit to an end of the washer fluid channel unit opposing the end of the washer fluid channel unit, wherein the fluid, in particular the washer fluid, in particular, flows through the washer fluid channel unit. As a result, the washer fluid channel unit, in particular, may be connected on the shortest path to the spraying unit, whereby, in particular, a compact design may be achieved.

It is further proposed that the wiper device comprises the wiper arm adapter and at least one washer fluid channel unit, which in at least one assembled state is fixedly, in particular rigidly and/or immovably, arranged at least in an end region of the wiper arm adapter facing the spraying unit, in particular in the wiper blade longitudinal direction, in the wiper arm adapter. The washer fluid channel unit is provided, in particular, for a connection to the spraying unit. In particular, the washer fluid channel unit is provided during the assembly of the wiper arm adapter to the wiper blade adapter to be connected automatically to the spraying unit, in particular without external intervention and/or by avoiding specific handling by an operator, in particular undertaken on the spraying unit and/or on the washer fluid channel unit. For example, the washer fluid channel unit could be arranged outside the wiper arm adapter and, in particular, fastened laterally to the wiper arm adapter. In particular, the washer fluid channel unit is arranged inside the wiper arm adapter and, in particular, arranged at least in the end region facing the spraying unit rigidly and/or immovably relative to the wiper arm adapter. The washer fluid channel unit in the assembled state is, in particular, indirectly and/or directly connected to the wiper arm adapter at least in the end region facing the spraying unit. As a result, in particular, an easy accessibility of the washer fluid channel unit and/or a simple production of a connection between the washer fluid channel unit and the spraying unit may be achieved.

For example, the spraying unit could comprise at least two, and advantageously at least three, nozzle elements which could be provided to spray washer fluid in different directions. Preferably, the spraying unit comprises at least four, in particular at least five, advantageously at least six, nozzle elements which are provided to spray washer fluid in different directions. In particular, in the assembled state in the wiping direction at least two, and advantageously at least three, nozzle elements are arranged on a first side of the spraying unit. The nozzle elements arranged on the first side of the spraying unit have, in particular, differently oriented spray directions which enclose with the wiping direction, in particular, different minimum angles. In particular, the nozzle elements arranged on the first side of the spraying unit are arranged adjacent to one another in the wiper blade longitudinal direction. In particular, in the assembled state in the wiping direction at least two, and advantageously at least three, nozzle elements are arranged on a second side of the spraying unit opposing the first side in the wiping direction. The nozzle elements arranged on the second side of the spraying unit have, in particular, differently oriented spraying directions which enclose with the wiping direction different minimum angles. In particular, the nozzle elements arranged on the second side of the spraying unit are arranged adjacent to one another in the wiper blade longitudinal direction. As a result, in particular, an optimal cleaning of the window to be wiped may be achieved. In particular, a plurality of directions may be covered and, in particular, during any wiping movement washer fluid may be sprayed specifically in the direction of movement before a moving wiper blade.

Particularly advantageous operating properties may be achieved by a wiper having at least one wiper device according to the invention.

The operating properties may be further improved, in particular, by a method for the assembly of at least one wiper device according to the invention, comprising a wiper blade adapter having at least one first wiper blade adapter element and at least one second wiper blade adapter element, which is connected to the first wiper blade adapter element and which is provided for connecting to at least one wiper arm adapter, and comprising a spraying unit, wherein the spraying unit is arranged at least partially between the first wiper blade adapter element and the second wiper blade adapter element.

The wiper device according to the invention is not intended to be limited here to the above-described use and embodiment. In particular, for fulfilling a mode of operation described herein, the wiper device according to the invention may have a number of individual elements, components and units which is different from a number cited herein.

BRIEF DESCRIPTION OF THE DRAWINGS

Further advantages are disclosed from the following description of the drawings. In the drawings, an exemplary embodiment of the invention is shown. The drawings, the description and the claims contain numerous features in combination. The person skilled in the art will also expediently consider the features individually and combine them to form further meaningful combinations.

In the drawings.

DETAILED DESCRIPTION

Figure 1:
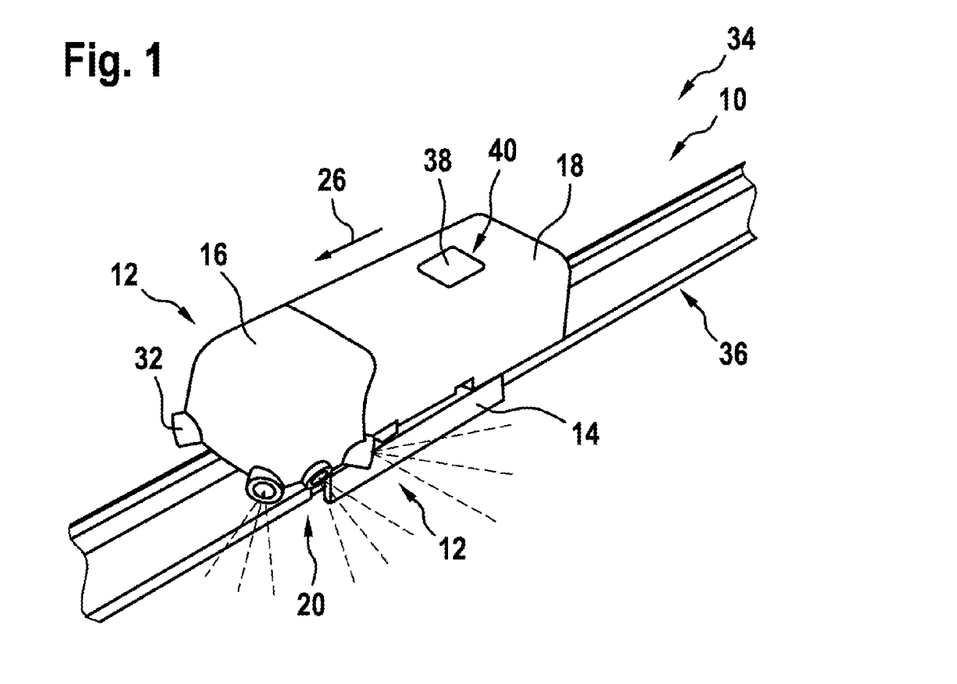
FIG. 1 shows a wiper with a wiper device according to the invention in a schematic perspective view.

FIG. 1 shows a wiper 34 comprising a wiper device 10. The wiper device 10 has a wiper blade component 36. The wiper blade component 36 is provided to be moved in an operating state over a window to be wiped. In the operating state, the wiper blade component 36 is arranged in contact with the window to be wiped.

The wiper device 10 has a wiper blade adapter 12. The wiper blade adapter 12 has a first wiper blade adapter element 14 and a second wiper blade adapter element 16 (see FIGS. 1 and 3). The first wiper blade adapter element 14 is provided for connecting to the wiper blade component 36.

The second wiper blade adapter element 16 is connected in the assembled state to the first wiper blade adapter element 14. The first wiper blade adapter element 14 has a bearing pin 42. The second wiper blade adapter element 16 has a bearing recess 44. In the assembled state the bearing pin 42 partially engages in the bearing recess 44 (see FIG. 8).

Figure 8:
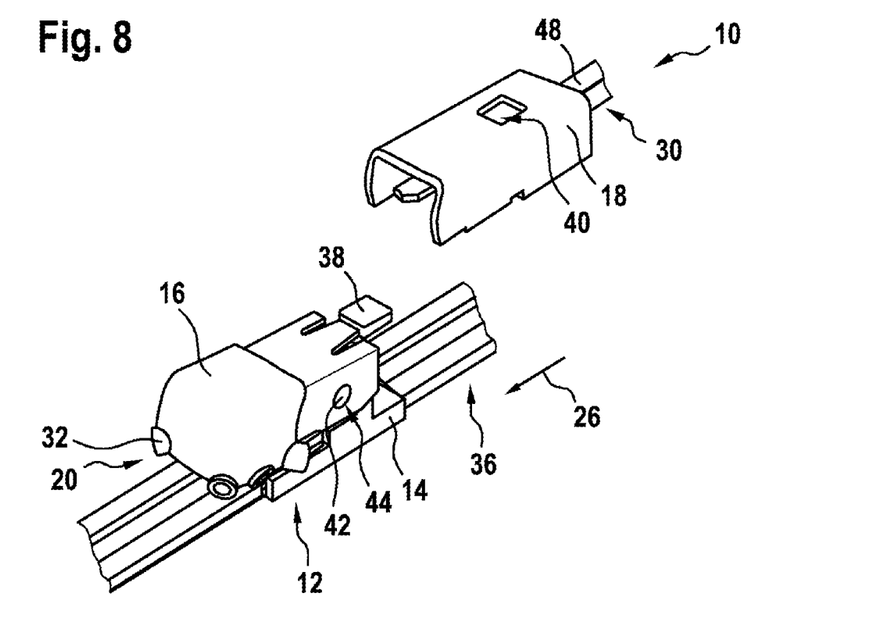
FIG. 8 shows the wiper blade adapter, the wiper blade component and the spraying unit in an assembled state and the wiper arm adapter and the washer fluid channel unit which is arranged in the wiper arm adapter in an assembly step in a schematic perspective view.

The bearing pin 42 defines a pivot axis (not shown). In the assembled state, the second wiper blade adapter element 16 is pivotably mounted about the bearing axis relative to the first wiper blade adapter element 14 on the first wiper blade adapter element 14.

The second wiper blade adapter element 16 is provided for connecting to a wiper arm adapter 18. The wiper device 10 has the wiper arm adapter 18 (see FIGS. 1 and 2). In the assembled state, the wiper arm adapter 18 and the second wiper blade adapter element 16 are connected together. The wiper arm adapter 18 in the assembled state is fastened to the second wiper blade adapter element 16. In the assembled state, the wiper arm adapter 18 is fastened by means of a latching connection to the second wiper blade adapter element 16.

Figure 2:
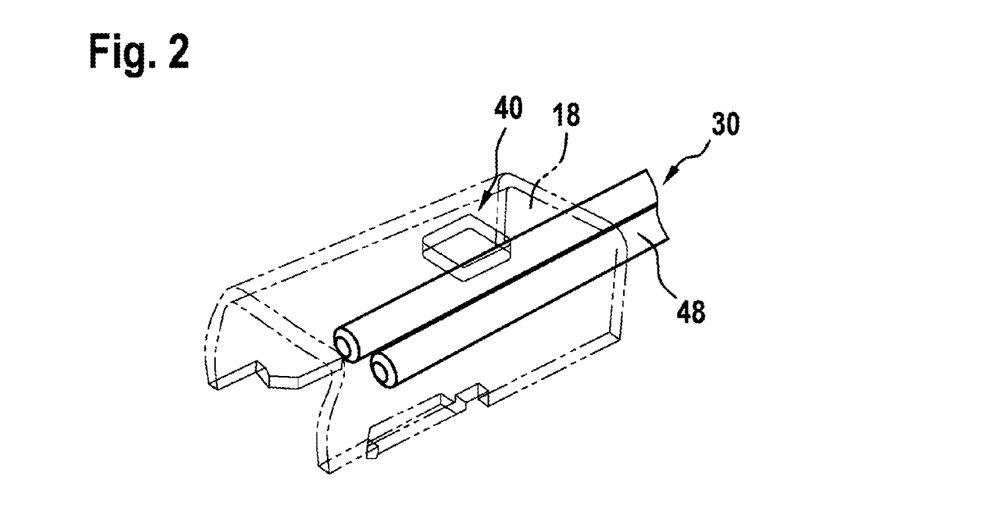
FIG. 2 shows a wiper arm adapter and a washer fluid channel unit of the wiper device in a schematic perspective view.

The second wiper blade adapter element 16 has a second latching element 38 which is provided to be coupled to a wiper arm adapter latching element 40 of the wiper arm adapter 18. During a fastening process, the second latching element 38 is provided to be elastically deflected in order to engage subsequently by an internal clamping force behind the wiper arm adapter latching element 40. The wiper arm adapter latching element 40 is configured as a latching recess.

Figure 3:
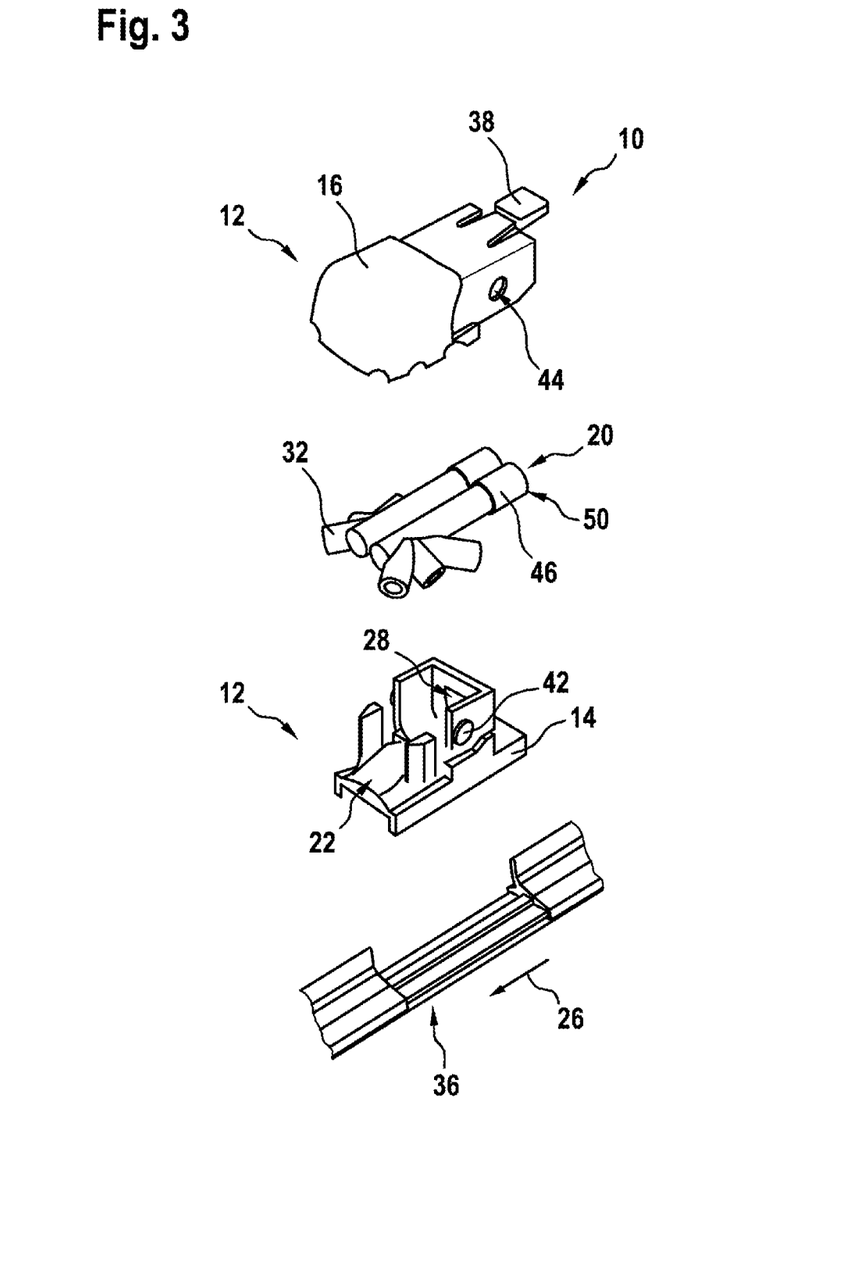
FIG. 3 shows a first wiper blade adapter element and a second wiper blade adapter element of a wiper blade adapter of the wiper deice, a wiper blade component and a spraying unit of the wiper device in a schematic exploded view.
Figure 4:
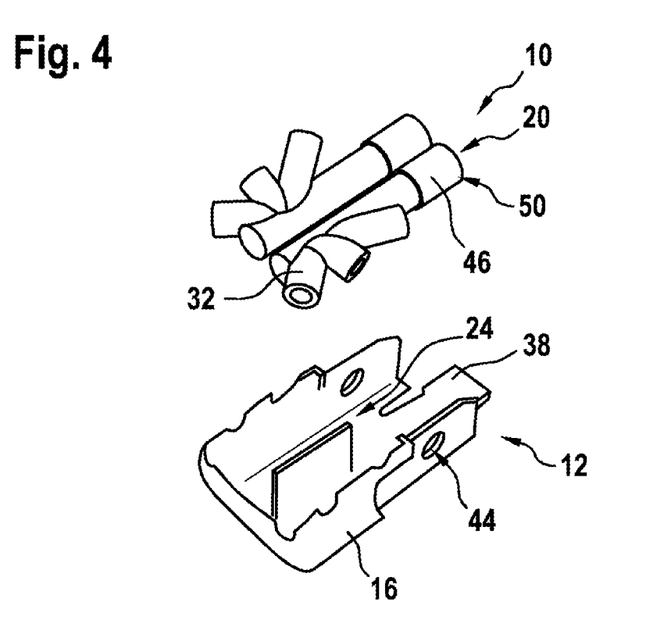
FIG. 4 shows the spraying unit and the second wiper blade adapter element in an assembly step in a schematic perspective view.

The wiper device 10 has a spraying unit 20 (see FIGS. 1 and 3). The spraying unit 20 is provided in the operating state to spray washer fluid onto the window to be wiped. In the assembled state the spraying unit 20 is partially arranged between the first wiper blade adapter element 14 and the second wiper blade adapter element 16.

In a method for the assembly of the wiper device 10, the spraying unit 20 is partially arranged between the first wiper blade adapter element 14 and the second wiper blade adapter element 16 (see FIGS. 3 to 8). The spraying unit 20 is connected to the second wiper blade adapter element 16. In the assembled state the spraying unit 20 is connected to the second wiper blade adapter element 16.

The second wiper blade adapter element 16 has a second receiving region 24. The spraying unit 20 is introduced in the method into the second receiving region 24 (see FIGS. 4 and 5). In the assembled state, the second receiving region 24 receives a substantial part of the spraying unit 20. In the assembled state, the spraying unit 20 is substantially surrounded by the second wiper blade adapter element 16.

Figure 5:
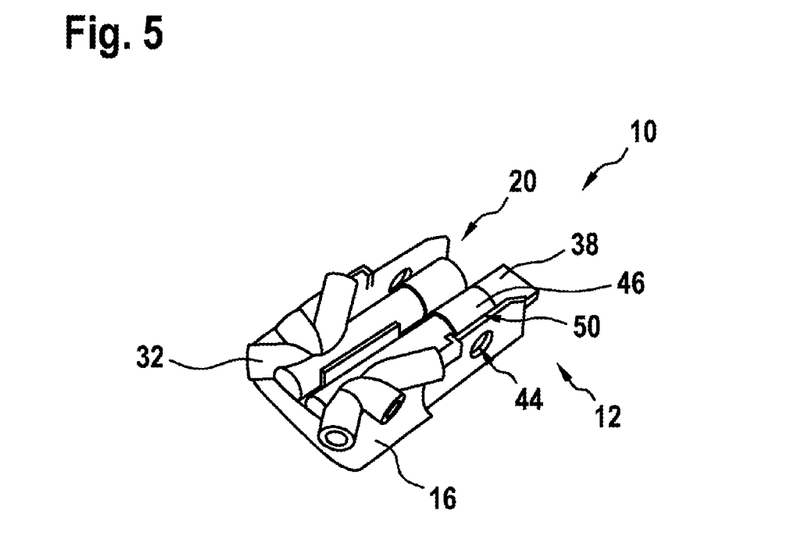
FIG. 5 shows the spraying unit and the second wiper blade adapter element in an assembled state in a schematic perspective view.

In the assembled state, the spraying unit 20 is connected to a wall of the second wiper blade adapter element 16 delimiting the second receiving space 24. In the present exemplary embodiment, in the assembled state the spraying unit 20 is connected by means of a latching connection to the second wiper blade adapter element 16.

Figure 6:
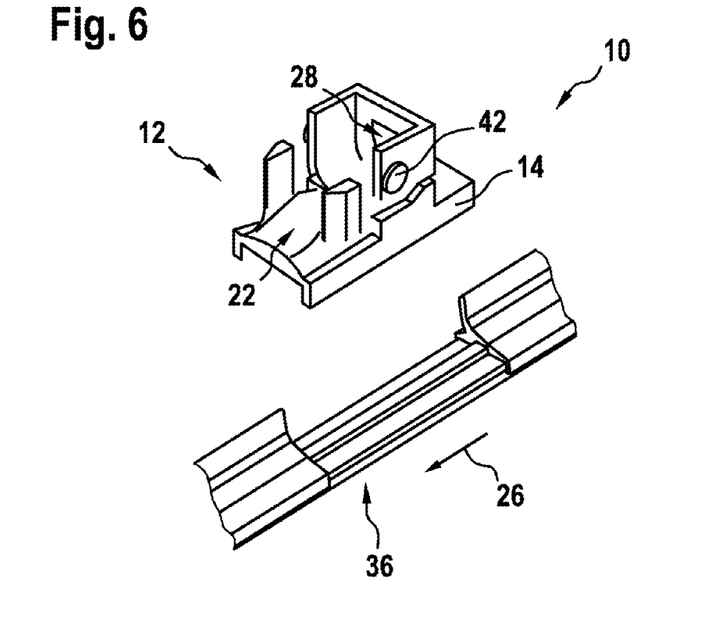
FIG. 6 shows the wiper blade component and the first wiper blade adapter element in an assembly step in a schematic perspective view.

In the method, the first wiper blade adapter element 14 is connected to the wiper blade component 36 (see FIG. 6). The wiper blade component 36 has a connecting region which is provided for connecting to the first wiper blade adapter element 14.

Figure 7:
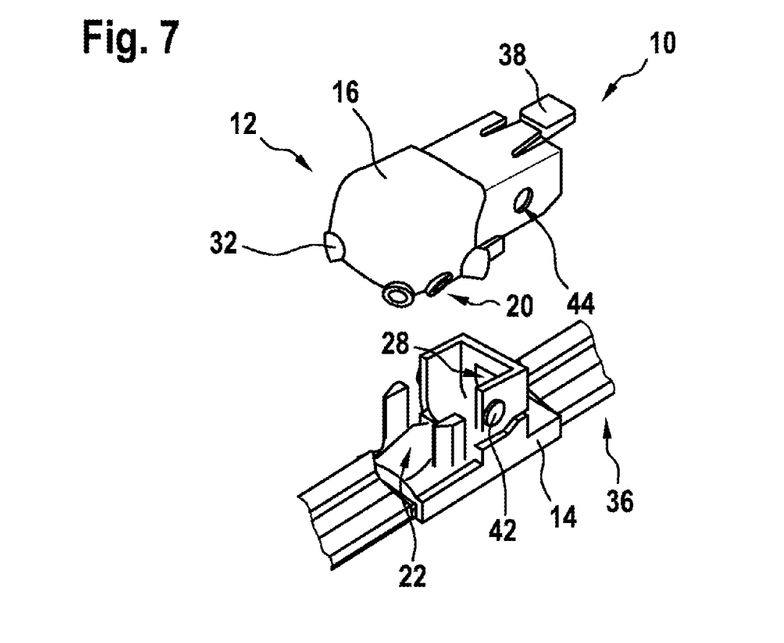
FIG. 7 shows the first wiper blade adapter element which is connected to the wiper blade component and the second wiper blade adapter element which is connected to the spraying unit in an assembly step in a schematic perspective view.

In the method, the second wiper blade adapter element 16 together with the spraying unit 20 connected to the second wiper blade adapter element 16 are connected to the first wiper blade adapter element 14 (see FIG. 7). In the assembled state, the spraying unit 20 is substantially surrounded on all sides by the wiper blade adapter elements 14, 16.

The first wiper blade adapter element 14 has a first receiving region 22. The first receiving region 22 in the assembled state receives a part of the spraying unit 20. The first receiving region 22 and the second receiving region 24 define together a collective receiving region for the spraying unit 20. In the assembled state the first wiper blade adapter element 14 partially forms a wall facing the window to be wiped, in particular a low wall, in particular a floor, of the collective receiving region.

In the assembled state, a part of the spraying unit 20 is arranged in a vertical direction facing the window to be wiped above the first wiper blade adapter element 14. The vertical direction in the assembled state is oriented perpendicular to the window to be wiped.

A further part of the spraying unit 20 in the assembled state is arranged to be freestanding in the vertical direction facing the window to be wiped (see FIG. 8). The spraying unit 20 in the assembled state protrudes in a wiper blade longitudinal direction 26 partially over the first wiper blade adapter element 14.

In the present exemplary embodiment, the spraying unit 20 has six nozzle elements 32. In each case, only one of the repeatedly present objects is provided with a reference numeral in the figures. In the assembled state, the nozzle elements 32 are substantially arranged in the further part of the spraying unit 20 which protrudes over the first wiper blade adapter element 14.

The nozzle elements 32 are arranged symmetrically in a longitudinal plane of symmetry. The longitudinal plane of symmetry in the assembled state is oriented substantially perpendicular to the window to be wiped. The longitudinal plane of symmetry in the assembled state is oriented substantially parallel to the wiper blade longitudinal direction 26.

A group of nozzle elements 32 is arranged on each side of the longitudinal plane of symmetry. Each group of nozzle elements 32 has three nozzle elements 32. A first group of nozzle elements 32 is arranged on a first side of the longitudinal plane of symmetry. A second group of nozzle elements 32 is arranged on a second side of the longitudinal plane of symmetry opposing the first side in the wiping direction. In the operating state, the nozzle elements 32 spray washer fluid in different directions onto the window to be wiped.

Figure 11:
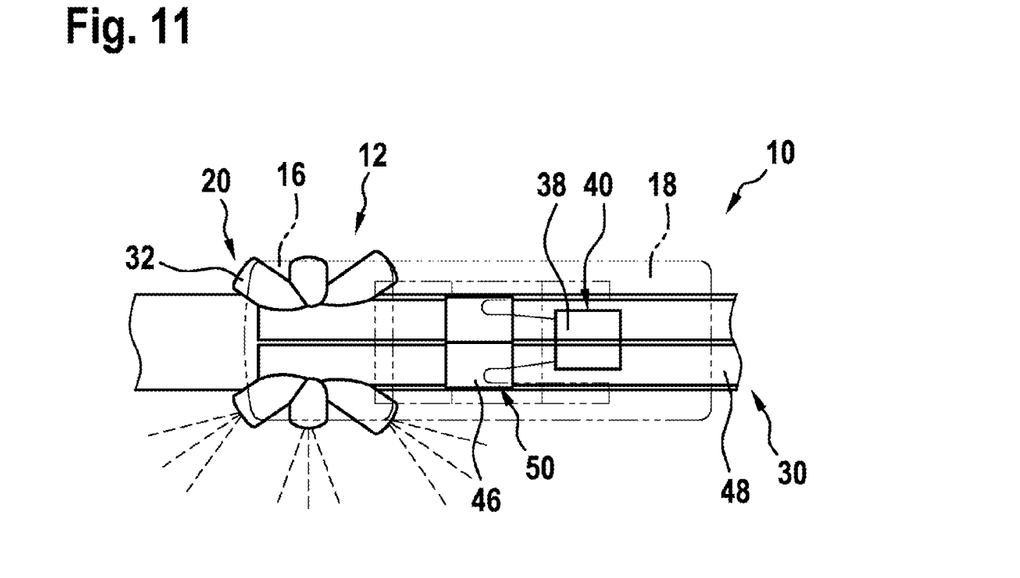
FIG. 11 shows the wiper blade adapter, the wiper blade component, the wiper arm adapter, the washer fluid channel unit and the spraying unit in an operating state in a schematic partially transparent view.

In the wiper blade longitudinal direction 26, the nozzle elements 32 of each group are arranged adjacent to one another. A central nozzle element of the nozzle elements 32 arranged adjacent to one another has a spraying direction which is oriented substantially parallel to a wiping direction (see FIGS. 1 and 11). The nozzle elements 32 arranged adjacent to the central nozzle element 32 in the wiper blade longitudinal direction 26 have in each case a spraying direction which is oriented obliquely relative to the wiping direction.

The nozzle elements 32 are arranged symmetrically in a transverse plane of symmetry. The transverse plane of symmetry, in the assembled state, is oriented substantially perpendicular to the window to be wiped. The transverse plane of symmetry, in the assembled state, is oriented substantially perpendicular to the wiper blade longitudinal direction 26.

The spraying unit has a washer fluid channel connecting unit 50. For each group of nozzle elements 32, the washer fluid channel connecting unit 50 has a washer fluid channel connecting element 46. The washer fluid channel connecting unit 50 has two washer fluid channel connecting elements 46. The washer fluid channel connecting elements 46 in each case are provided for connecting to a washer fluid channel element 48.

The wiper device 10 has a washer fluid channel unit 30. The washer fluid channel unit 30 has the washer fluid channel elements 48. In the present exemplary embodiment, the washer fluid channel unit 30 has two washer fluid channel elements 48.

Alternatively, the washer fluid channel unit could have, in particular, a single washer fluid channel element. The spraying unit could, in particular, have a washer fluid channel connecting element which could be provided for connecting to the washer fluid channel element.

The washer fluid channel unit 30 in the assembled state is connected to the wiper blade adapter 18. In the assembled state, the washer fluid channel unit 30 extends substantially inside the wiper arm adapter 18. In an end region of the wiper arm adapter 18 facing the spraying unit 20, the washer fluid channel unit 30 in the assembled state is fixedly arranged in the wiper arm adapter 18.

In the assembled state, the washer fluid channel unit 30 partially engages through a through-recess 28 of the first wiper blade adapter element 14. The first wiper blade adapter element 14 has the through-recess 28 for the washer fluid channel unit 30.

In the method, the wiper arm adapter 18 is connected to the second wiper blade adapter element 16. When the wiper arm adapter 18 is moved in the wiper blade longitudinal direction 26 closer to the second wiper blade adapter element 16, the washer fluid channel unit 30 partially engages through the through-recess 28.

Figure 9:
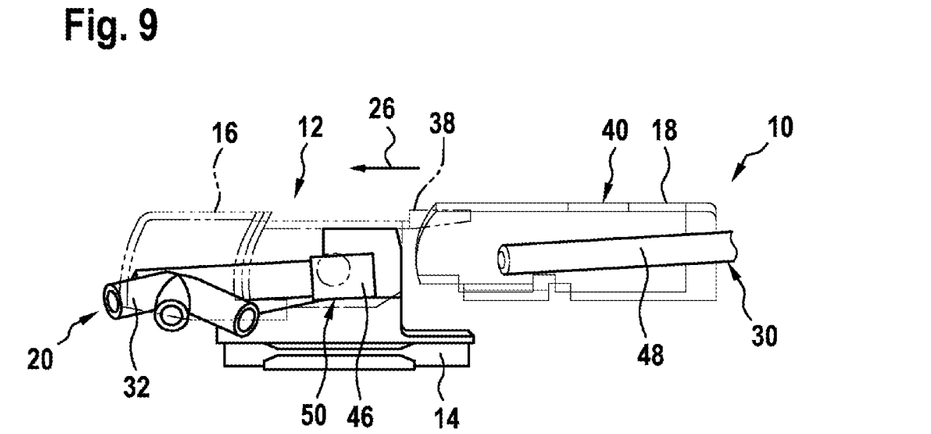
FIG. 9 shows the wiper blade adapter and the spraying unit in an assembled state and the wiper arm adapter and the washer fluid channel unit which is arranged in the wiper arm adapter, in an assembly step in a schematic partially transparent view.
Figure 10:
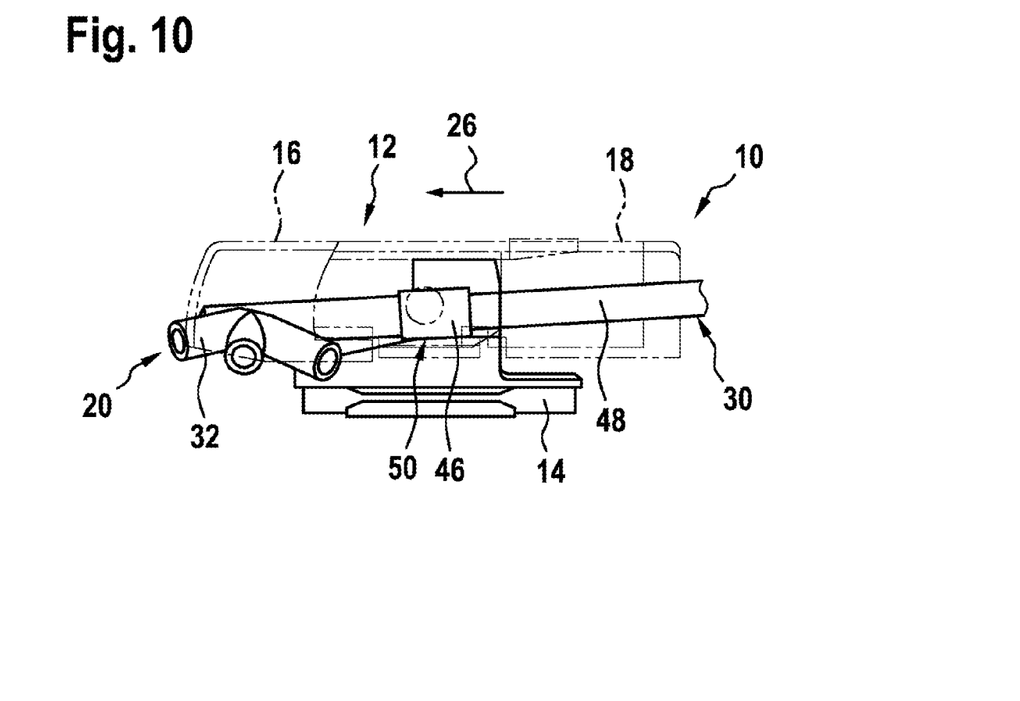
FIG. 10 shows the wiper blade adapter and the spraying unit, the wiper arm adapter and the washer fluid channel unit which is arranged in the wiper arm adapter, in an assembled state in a schematic partially transparent view.

Due to the fixed arrangement in the end region of the wiper arm adapter 18 facing the spraying unit 20, when the wiper arm adapter 18 is connected to the second wiper blade adapter element 16, the washer fluid channel unit 30 automatically engages in the washer fluid channel connecting unit 50 (see FIGS. 8 and 9).

Figure 12:
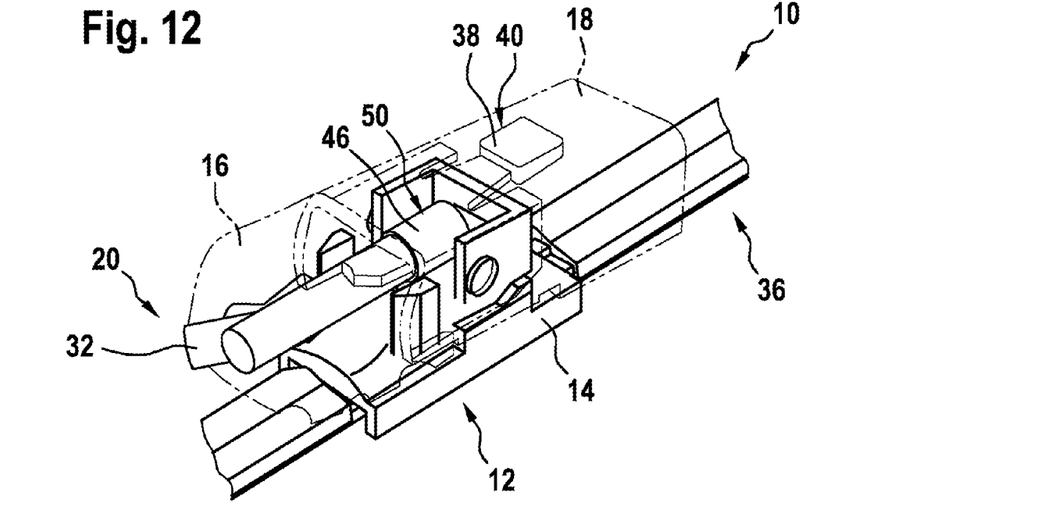
FIG. 12 shows the wiper blade adapter, the wiper blade component, the wiper arm adapter, the washer fluid channel unit and the spraying unit in a first operating state in a schematic partially transparent view.

By means of the first group of nozzle elements 32 the spraying unit 20 is provided in the operating state to spray washer fluid onto the window to be wiped, with an upward movement of the wiper 34 in the direction of movement (see FIG. 12). The first group of nozzle elements 32 is supplied by a first washer fluid channel element 46.

Figure 13:
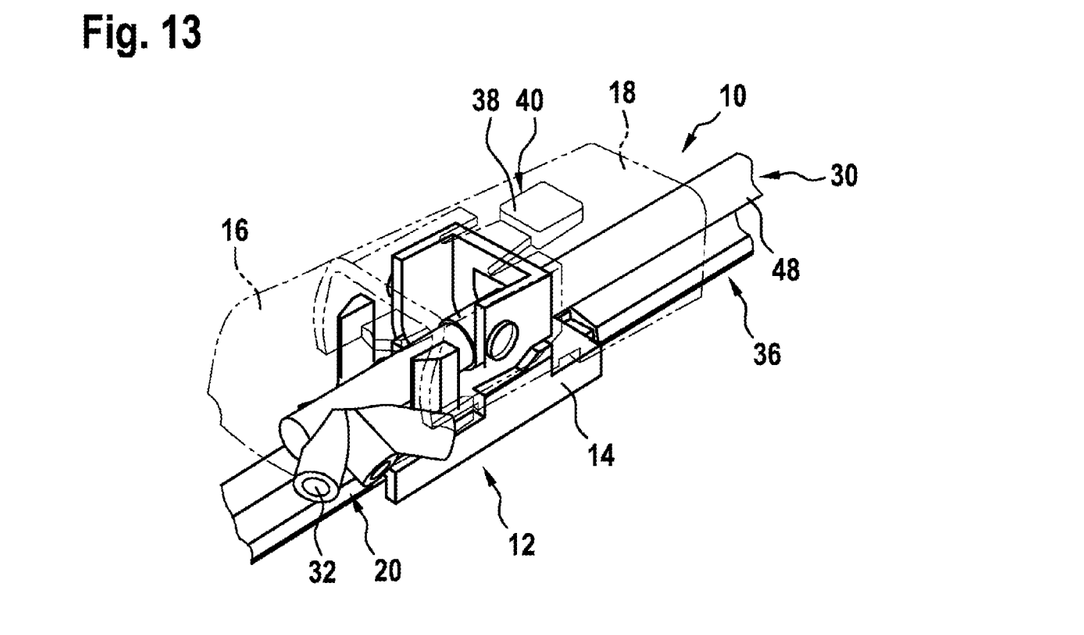
FIG. 13 shows the wiper blade adapter, the wiper blade component, the wiper arm adapter, the washer fluid channel unit and the spraying unit in a second operating state in a schematic partially transparent view

By means of the second group of nozzle elements 32 the spraying unit 20 is provided in the operating state to spray washer fluid onto the window to be wiped, with a downward movement of the wiper 34 in the direction of movement (see FIG. 13). The second group of nozzle elements 32 is supplied by a second washer fluid channel element 46.

Figure 14:
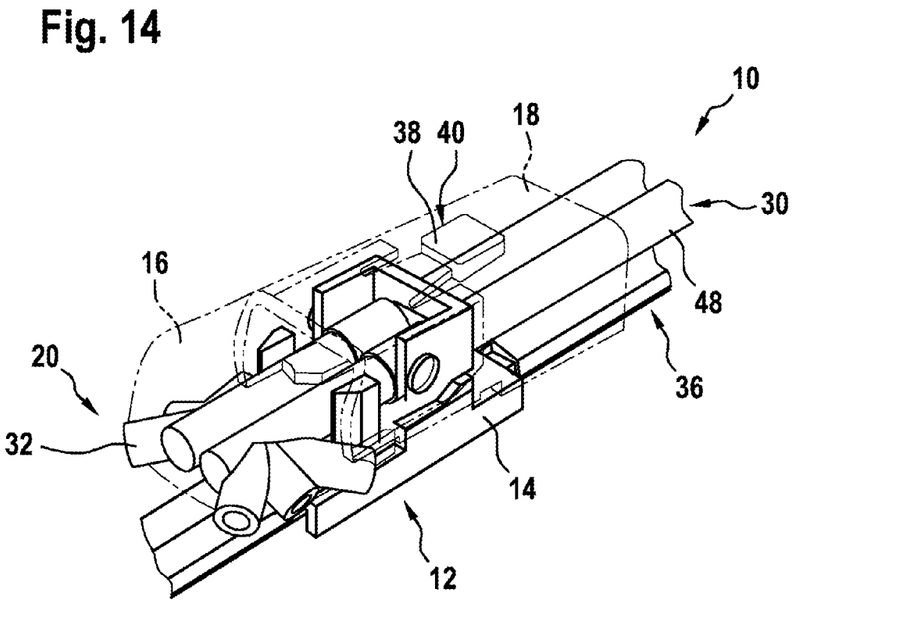
FIG. 14 shows the wiper blade adapter, the wiper blade component, the wiper arm adapter, the washer fluid channel unit and the spraying unit in a third operating state in a schematic partially transparent view.

The spraying unit 20 could be provided in the operating state to spray washer fluid onto the window to be wiped, in particular with a rapid sequence between an upward movement and a downward movement of the wiper 34, by means of the first group of nozzle elements 32 and the second group of nozzle elements 32 (see FIG. 14).

What is claimed is:

1. A wiper device comprising a wiper blade component (36) configured to be moved in an operating state over a window to be wiped, wherein the wiper blade component (36) includes a wiper blade adapter (12) having at least one first wiper blade adapter element (14) and at least one second wiper blade adapter element (16) which is connected to the first wiper blade adapter element (14) in at least one assembled state, and the wiper device also comprising a spraying unit (20), characterized in that the spraying unit (20) includes a nozzle element (32), and in the assembled state the nozzle element (32) of the spraying unit (20) is arranged at least partially between the first wiper blade adapter element (14) and the second wiper blade adapter element (16), wherein the wiper device further includes a separate wiper arm component and a wiper arm adapter (18) connected to an end of the separate wiper arm component, wherein the wiper arm adapter (18) is configured to releasably connect to the at least one second wiper blade adapter element (16), and wherein the wiper device further includes at least one washer fluid channel unit (30) which in at least one assembled state is fixedly arranged in at least an end region of the wiper arm adapter (18) facing the spraying unit (20) in the wiper arm adapter (18).

2. The wiper device as claimed in claim 1, characterized in that in the assembled state the spraying unit (20) is connected to the second wiper blade adapter element (16).

3. The wiper device as claimed in claim 2, characterized in that in the assembled state the spraying unit (20) is connected to the second wiper blade adapter element (16) by a latching connection.

4. The wiper device as claimed in claim 1, characterized in that the first wiper blade adapter element (14) defines at least one first receiving region (22) which is configured in the assembled state to receive at least one part of the spraying unit (20).

5. The wiper device as claimed in claim 1, characterized in that the second wiper blade adapter element (16) defines at least one second receiving region (24) which is configured in the assembled state to receive at least a substantial part of the spraying unit (20).

6. The wiper device as claimed in claim 1, characterized in that in the assembled state the spraying unit (20) protrudes in a wiper blade longitudinal direction (26) at least partially over the first wiper blade adapter element (14).

7. The wiper device as claimed in claim 1, characterized in that the first wiper blade adapter element (14) comprises at least one through-recess (28) for at least one washer fluid channel unit (30).

8. The wiper device as claimed in claim 1, characterized in that the spraying unit (20) comprises at least four of the nozzle elements (32), wherein each of the at least four of the nozzle elements (32) is configured to spray washer fluid in different directions.

9. The wiper device as claimed in claim 8, characterized in that each of the at least four of the nozzle elements (32) is arranged at least partially between the first wiper blade adapter element (14) and the second wiper blade adapter element (16).

10. The wiper device as claimed in claim 8, characterized in that the connecting element (46) is fluidly connected to at least two of the nozzle elements (32).

11. A wiper having the wiper device (10) as claimed in claim 1.

12. A method for the assembly of the wiper device (10) as claimed in claim 1, the method comprising arranging the spraying unit (20) at least partially between the first wiper blade adapter element (14) and the second wiper blade adapter element (16).

13. The wiper device as claimed in claim 1, characterized in that in the assembled state the spraying unit (20) is substantially surrounded on all sides by the wiper elements (14, 16).

14. The wiper device as claimed in claim 1, characterized in that the spraying unit (20) includes a connecting element (46) configured to be connected to a washer fluid channel, the connecting element (46) being fluidly connected to the nozzle element (32).

15. The wiper device as claimed in claim 1, wherein the at least one first wiper blade adapter element (14) and the at least one second wiper blade adapter element (16) are pivotally coupled to one another.

16. The wiper device as claimed in claim 1, wherein the wiper arm adapter (18) includes a first latching element (38, 40), and the second wiper blade adapter element (16) includes a second latching element (38, 40) configured to releasably latch with the first latching element.

17. The wiper device as claimed in claim 16, wherein the first latching element (40) is an opening in the wiper arm adapter (18), and the second latching element (38) is a deflectable tab on the at least one second wiper blade adapter element (16).

18. A wiper device comprising a wiper blade adapter (12) having at least one first wiper blade adapter element (14) and at least one second wiper blade adapter element (16) which is connected to the first wiper blade adapter element (14) in at least one assembled state and is configured for connecting to at least one wiper arm adapter (18), and the wiper device also comprising a spraying unit (20), characterized in that the spraying unit (20) includes a nozzle element (32), and in the assembled state the nozzle element (32) of the spraying unit (20) is arranged at least partially between the first wiper blade adapter element (14) and the second wiper blade adapter element (16), and wherein the wiper device further comprises a wiper arm adapter (18) and at least one washer fluid channel unit (30) which in at least one assembled state is fixedly arranged in at least an end region of the wiper arm adapter (18) facing the spraying unit (20) in the wiper arm adapter (18).

19. The wiper device as claimed in claim 18, characterized in that in the assembled state the spraying unit (20) is connected to the second wiper blade adapter element (16).

20. The wiper device as claimed in claim 19, characterized in that in the assembled state the spraying unit (20) is connected to the second wiper blade adapter element (16) by a latching connection.

21. The wiper device as claimed in claim 18, characterized in that the first wiper blade adapter element (14) defines at least one first receiving region (22) which is configured in the assembled state to receive at least one part of the spraying unit (20).

* * * * *